US010310990B2

(12) United States Patent
Shaw et al.

(10) Patent No.: US 10,310,990 B2
(45) Date of Patent: Jun. 4, 2019

(54) DIRECT MEMORY ACCESS ENCRYPTION WITH APPLICATION PROVIDED KEYS

(71) Applicant: Hewlett Packard Enterprise Development LP, Houston, TX (US)

(72) Inventors: Adrian Shaw, Bristol (GB); Geoffrey Ndu, Bristol (GB); Fraser John Dickin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 220 days.

(21) Appl. No.: 15/192,493

(22) Filed: Jun. 24, 2016

(65) Prior Publication Data
US 2017/0371808 A1 Dec. 28, 2017

(51) Int. Cl.
*G06F 12/14* (2006.01)
*G06F 13/28* (2006.01)

(52) U.S. Cl.
CPC ...... *G06F 12/1408* (2013.01); *G06F 12/1466* (2013.01); *G06F 13/28* (2013.01); *G06F 2212/1052* (2013.01); *G06F 2212/402* (2013.01)

(58) Field of Classification Search
CPC ........ G06F 13/00; G06F 13/12; G06F 13/122; G06F 13/28; G06F 2212/402; G06F 12/1408; G06F 12/1466; G06F 2212/1052
See application file for complete search history.

(56) References Cited

U.S. PATENT DOCUMENTS

| 7,757,280 | B2 | 7/2010 | Backes et al. |
| 8,522,041 | B2 | 8/2013 | Hsu et al. |
| 9,152,825 | B2 | 10/2015 | Sarcone |
| 9,256,551 | B2 | 2/2016 | Paaske et al. |
| 2007/0226450 | A1* | 9/2007 | Engbersen .......... G06F 12/1483 711/203 |
| 2008/0222663 | A1* | 9/2008 | Carpenter ............. G06F 12/145 719/328 |
| 2014/0173236 | A1* | 6/2014 | Kegel ................. G06F 12/1441 711/163 |
| 2015/0269091 | A1* | 9/2015 | Horovitz ................. G06F 21/79 711/145 |

(Continued)

OTHER PUBLICATIONS

Munch et al., Hardware-Based I/O Virtualization for Mixed Criticality Real-Time Systems Using PCIe SR-IOV, IEEE, 8 pages (Year: 2013).*

(Continued)

*Primary Examiner* — Alis S Abyaneh
*Assistant Examiner* — Huan V Doan
(74) *Attorney, Agent, or Firm* — Hewlett Packard Enterprise Patent Department

(57) ABSTRACT

In one example in accordance with the present disclosure, a method may include retrieving, at a memory management unit (MMU), encrypted data from a memory via direct memory access and determining, at the MMU, a peripheral that is the intended recipient of the encrypted data. The method may also include accessing an application key used for transmission between an application and the peripheral, wherein the application key originates from the application and decrypting, at the MMU, the encrypted data using the application key and transmitting the decrypted data to the peripheral.

19 Claims, 5 Drawing Sheets

(56) References Cited

U.S. PATENT DOCUMENTS

2017/0024570 A1* 1/2017 Pappachan .............. G06F 13/28
2017/0090800 A1* 3/2017 Alexandrovich ..... G06F 3/0622

OTHER PUBLICATIONS

Mahar, A.J. et al. "Design and Characterization of a Hardware Encryption Management Unit for Secure Computing Platforms," Proceedings of the 39th Annual Hawaii International Conference on System Sciences (HICSS'06). vol. 10, IEEE, 2006, available at https://www.computer.org/csdl/proceedings/hicss/2006/2507/10/2507100251b.pdf.

* cited by examiner

DIRECT MEMORY ACCESS ENCRYPTION WITH APPLICATION PROVIDED KEYS

BACKGROUND

Direct Memory Access (DMA) allows hardware of a computer system to access system memory, such as Random Access Memory (RAM) independently of the processor of the computer system.

BRIEF DESCRIPTION OF THE DRAWINGS

The following detailed description references the drawings, wherein.

DETAILED DESCRIPTION

Technology that encrypts memory to process address space may provide confidentiality to applications within a particular address space. However, applications that have encrypted data may not be able to interact with peripherals in a private matter. Peripherals are hardware devices connected to a computer system via a peripheral interface. Peripherals may include, for example, a disk controller, a graphics processing unit (GPU), a network interface controller (NIC), a keyboard controller, etc. To interact with peripherals, communication may be transmitted in plain text to the peripheral and may be accessed by systems in between, such as an operating system kernel. As such, it may be technically challenging to keep communications with a peripheral secure, especially if an operating system has been compromised and is able to gain access to the plain text communications between peripherals and applications.

This disclosure provides a technical solution to that challenge by facilitating direct memory access encryption with application provided keys to enable private communication between an application and a peripheral. In particular, systems and methods for direct memory access encryption with application provided keys discussed herein enable private communication between an application and a peripheral through the use of a hardware/software architecture. The direct memory access encryption may be facilitated by modifying hardware of a MMU (memory management unit) with an encryption/decryption hardware unit that may encrypt DMA transactions to and from certain peripherals on particular bus addresses on-the-fly using a key provided by a user. The MMU may also include a privileged piece of firmware that is able to assign cryptographic keys to particular hardware addresses and protect the confidentiality and integrity of the IOMMU configuration. Using this combination of hardware and software, an application can generate a session key and securely transmit the session key to an IO device without exposing the IO data to an Operating System kernel. As used herein, the term Operating System (OS) may refer to any combination of hardware and software that manages system resources and this software can be any suitable component such as a hypervisor.

An example method for direct memory access encryption with application provided keys may include retrieving, at a memory management unit (MMU), encrypted data from a memory via direct memory access and determining, at the MMU, a peripheral that is the intended recipient of the encrypted data, wherein the peripheral is attached to a computer system. The method may also include accessing an application key used for transmission between an application and the peripheral, wherein the application key originates from the application and decrypting, at the MMU, the encrypted data using the application key and transmitting the decrypted data to the peripheral.

Figure 1:
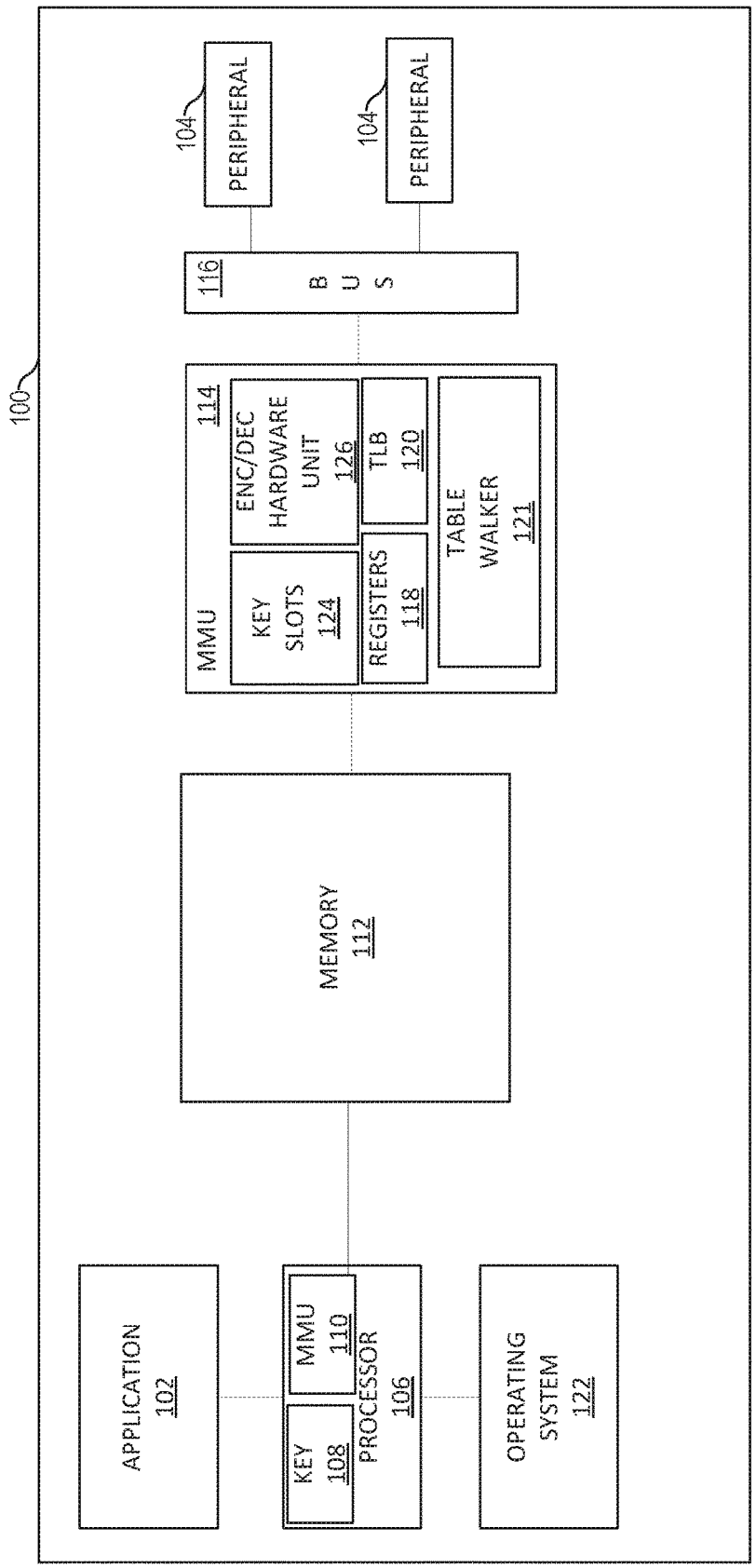
FIG. 1 is a block diagram of an example system for direct memory access encryption with application provided keys.

FIG. 1 is a block diagram of an example system 100 for direct memory access encryption with application provided keys. The system 100 may be used to securely transmit information between an application 102 executing on the system and a peripheral 104 attached to the system 100. The peripherals 104 may not have hardware and/or software that supports encryption of data without assistance from the MMU 114. Peripherals 104 may include a frame buffer on a video card, a packet buffer on a network interface card, an accelerator exposed through memory mapping, etc.

System 100 may include a processor 106 that may include a Central Processing Unit (CPU) or another suitable hardware processor. The processor 106 may have the capability to enter a secure mode. The processor 106 may also have access to a key 108 that may be used for encrypting data that is to be received by the peripheral 104. Although only one key 108 is pictured, system 100 may have multiple keys 108. For example, the processor 106 may have access to one key 108 for each peripheral 104. As discussed in further detail below, keys 108 may be dynamically provisioned at runtime. Processor 106 may also include a memory management unit 110 for communicating with a memory 112.

The processor 106 and a memory 112 may be coupled to each other through a communication link (e.g., a bus). In some examples, memory 112 may store machine readable instructions executed by processor 106 for system 100. Memory 112 may include any volatile memory, non-volatile memory, or any suitable combination of volatile and non-volatile memory. Memory 112 may comprise, for example, may be, for example, Random Access Memory (RAM), an Electrically-Erasable Programmable Read-Only Memory (EEPROM), a storage drive, an optical disc, and/or other suitable memory. Memory 112 may also include a random access non-volatile memory that retains its content when the power is off.

Memory 112 may also be accessed by a memory management unit 114. MMU 114 may connect to a bus 116, such as a PCI bus, used to communicate with the peripherals 104. For example, bus 116 may receive data transactions from the peripherals 104 and put the received data on a memory bus towards the memory 112. In this way, the MMU 114 converts the data from the device to the memory. MMU 114 may have a variety of registers 118. Registers 118 may include a table base register with a list of devices and associated page table. This page table may be used by the MMU 114 for converting virtual memory addresses to physical memory addresses and vice versa. A Translation Lookaside buffer (TLB) 120 comprises a memory cache for storing translations of virtual memory to physical memory. TLB 120 may include a cache of page table entries. Responsive to data being received at the MMU 114, a table walker 121 may analyze the page table and select the corresponding key for the target peripheral. MMU 114 may receive inputs from command buffer (INPUTS) from the OS, hypervisor, etc.

Memory management unit 114 may vary depending on the architecture of the system 100. For example, in an x86 architecture, the MMU 114 may comprise an Input/Output Memory Management Unit (IOMMU). In an ARM architecture, the MMU 114 may comprise a system memory management unit (SMMU). In some aspects, the MMU 114 may have various elements and capabilities. For example, if the MMU 114 is an SMMU, the SMMU may have one MMU 114 per peripheral. In these aspects, the MMU can be provisioned with a key used for protecting the keys 108 used for encryption from the OS at the time of manufacture. The keys used for protecting the keys 108 for encryption from the OS are discussed in further detail below in reference to FIG. 2 and method 200.

The MMU 114 may be used to transmit data securely from the processor 106 to a peripheral 104. An application 102 may have secure data to be transmitted to a peripheral 104. The application 102, via processor 106, may access a secure mode and determine a key 108 corresponding to the peripheral 104. Using the key 108, the processor 106 may encrypt the data from application 102 that is to be transmitted to peripheral 104. The processor 106 may access the memory 112 via the MMU 110. The MMU 110 may store the decrypted data in a first portion of the memory 112.

Operating system (OS) 122 may facilitate communication between the peripheral 104 and the application 102, by providing the MMU 114 access to encrypted data stored in the first portion of memory 112 accessed by the processor 106 and by providing the application 102 access to the encrypted data stored in a second portion of memory 112 accessed by MMU 114. In this manner, operating system 122 facilitates communication between the peripheral 104 to the application 102. Although the OS 122 can recognize that data is stored in the regions of memory 112, without a decryption key, the OS 122 cannot access the data. Although the OS 122 is used to facilitate communication between the peripheral 104 to the application 102, the OS 122 is not trusted to access the secure data as the OS 122 does not have a decryption key. In this manner, the application 102 running in the first portion of memory 112 can access data in the second portion of memory 112 as long as the application has the correct encryption/decryption key for the data. Likewise, the MMU 114 can access data in the first portion of the memory 112 as long the MMU 114 has the correct encryption/decryption key for the data.

MMU 114 may retrieve the encrypted data from the memory 112 and determine that the data is encrypted. MMU 114 may also determine the peripheral 104 that is the transmission target for the encrypted data. For example, MMU 114 may look at address information that is part of the encrypted data to determine a peripheral 104 that is the transmission target of the encrypted data. MMU 114 may then retrieve a corresponding key for the peripheral 104 from key slots 124. Key slots 124 may be a portion of the MMU 114 used for storing keys. Although the key slots 124 are depicted as being included on the MMU 114, the key slots 124 may be stored in any secure area, such as a managed secure area of DRAM, a cache of the MMU 114, etc.

An encryption/decryption hardware unit 126 of the MMU 114 may use the key retrieved from the key slots 124 to decrypt the encrypted data. MMU 114 may then pass the unencrypted data to the BUS 116, which then passes the unencrypted data to the target peripheral 104. In this manner, an application 102 can securely transmit data to the MMU 116 without making the plaintext data available to untrusted devices (such as the OS 122, a cloud administrator, eta) and the MMU 116 can decrypt the data and transmit the decrypted data directly to the peripheral.

In addition to allowing data to be securely sent from an application 102 and/or a processor 106 to a peripheral 104, system 100 may also be used to securely send data from a peripheral 104 to an application 102 and/or a processor 106. Peripheral 104 may transmit data to the MMU 114, via the bus 116. The MMU 114 may detect the data transmission and determine what peripheral 104 the transmission is coming from. If the peripheral 104 is associated with an encryption key from the key slots 124, the encryption/decryption hardware unit 126 of the MMU 114 may encrypt the data received from the peripheral. The MMU 114 may then transmit the encrypted data to a second portion of memory 112. As discussed above, the OS 122 may provide the MMU 114 access to encrypted data stored in the first portion of memory 112 accessed by the processor 106 and provide the application 102 access to the encrypted data stored in a second portion of memory 112 accessed by MMU 114. Application 102 may access the data in the first portion of memory, via MMU 110 of processor 106. Processor 106 may retrieve a key 108 corresponding to the peripheral 104 that transmitted the data, and processor 106 may use the key 108 to decrypt the data. Processor 106 may further provide the decrypted data to the application 102. In some examples, processor 106 may execute in a secure mode during this process. Secure mode is a level of execution for secure actions. By executing in secure mode, processor 106 may provide a "sandboxed" area for secure actions and may prevent non-secure applications executing in system 100 and non-secure elements 100 from accessing secure data.

Figure 2:
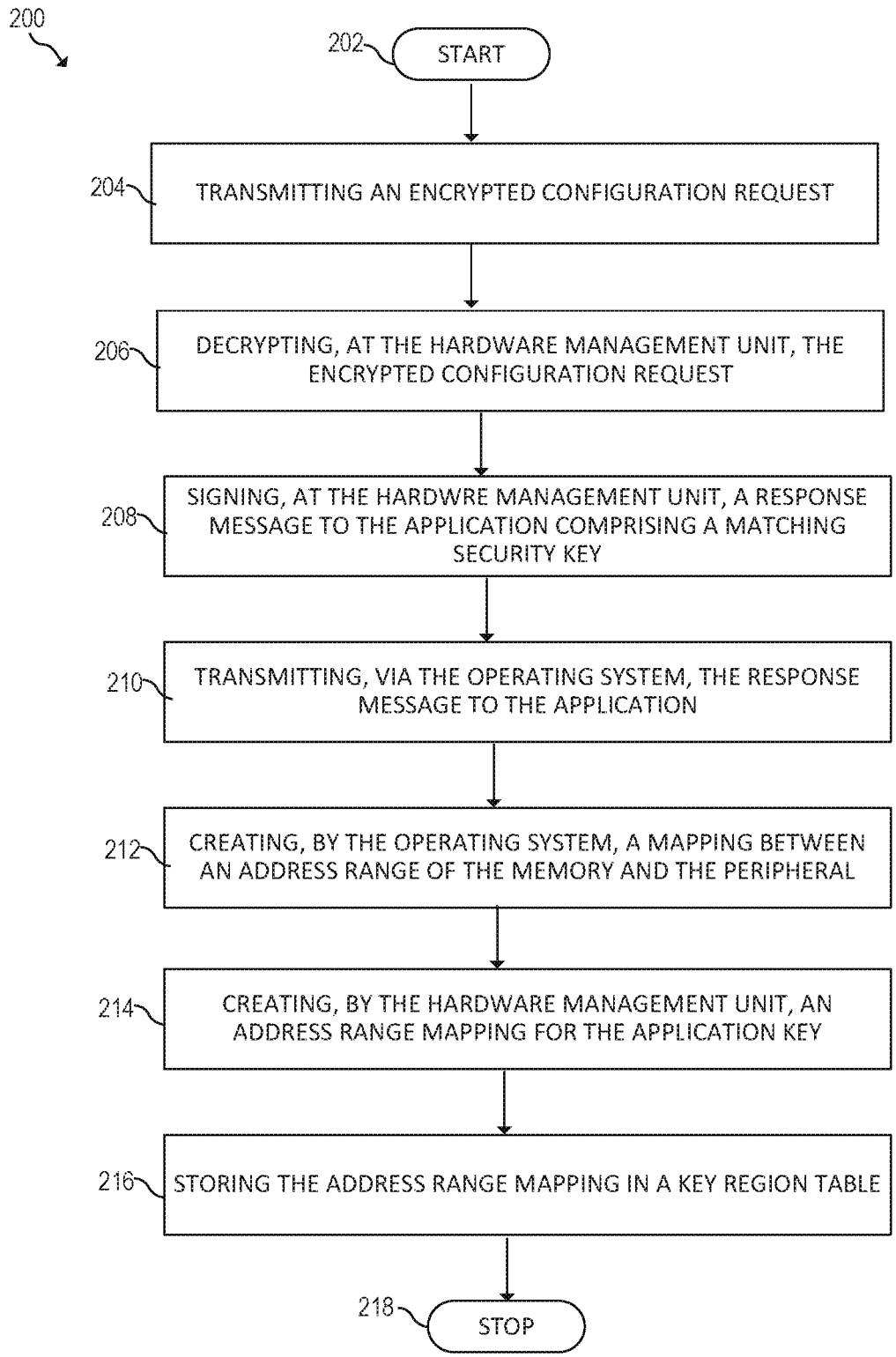
FIG. 2 is a flowchart of an example method for direct memory access encryption with application provided keys.

As described above, the systems and methods for direct memory access encryption with application provided keys may securely transmit data from an application to a peripheral and vice versa. However, the MMU may receive the encryption/decryption key before retrieving or transmitting data, so that the MMU is able to encrypt and/or decrypt data as desired. FIG. 2 is a flowchart of an example method 200 for providing an application key to a peripheral. Specifically, the application keys may be transmitted from an application executing in a secure portion of a processor to the MMU.

Method 200 may be described below as being executed or performed by a system, for example, system 100 of FIG. 1, system 400 of FIG. 4, and/or system 500 of FIG. 5. Other suitable systems and/or computing devices may be used as well.

Method 200 may be implemented in the form of executable instructions stored on at least one machine-readable storage medium of the system and executed by at least one processor of the system. The processor may include a Central Processing Unit (CPU) or another suitable hardware processor. Machine-readable storage medium may comprise, for example, may be, for example, Random Access Memory (RAM), an Electrically-Erasable Programmable Read-Only Memory (EEPROM), a storage drive, an optical disc, and/or other suitable memory. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include transmitting an encrypted configuration request to a hardware management unit. The encrypted configuration request may include a security key corresponding to the peripheral, a first identity of the hardware management unit and a second identity of the peripheral. The encryption request may also include additional information such as a secret number, random number, etc. The hardware management unit may be any component that is used to create mappings between an address range and a key. The hardware management unit may be part of a Read Only Memory (ROM), a microcontroller attached to the MMU, part of the MMU, etc. With reference to FIG. 1 and system 100, hardware management unit may be, for example, attached to or part of MMU 114.

The encryption request may originate from an application and be transmitted to the OS. The application may be executed by a processor in a secure mode and/or the application may be executed from a secure portion of the processor. Although an asymmetric approach may be used for the application key, a symmetric key approach may be used to provide the application key to the MMU.

In some examples, the application may be executed from a remote computer system via HTTP, a web based interface, etc. The OS may receive the encrypted configuration request and add additional information to the encrypted configuration request. Additional information may include an address range of memory associated with the application.

The hardware management unit may have an identity so that it can be identified by the application. The application may generate the key and bind it to a physical memory address accessible by the hardware management unit (such as a physical memory address of memory 112 illustrated in FIG. 1). Accordingly, data stored in the physical memory address may be associated with the generated key. The application may determine the identity of the MMU a priori. For example, the identity may be a public identity of the hardware management unit. The identity may be burnt onto the peripheral at the time of manufacture using, for example, electronic fuses in a one-time programmable (OTP) ROM region of the peripheral.

At block 206, the method may include decrypting, at the hardware management unit, the encrypted configuration request. At block 208, the method may include signing, at the hardware management unit, a response message to the application comprising a matching security key. The signing may be performed using the additional information, such as a random number. The response message may also include an identifier of the hardware management unit. The signing of the response message authenticates the hardware management unit. The application may verify the signature to determine if the operating system has tampered with the response message. At block 210, the method may include transmitting, via the operating system, the response message to the application. At block 212, the method may include creating, by the operating system, a mapping between an address range of the memory and the peripheral. At block 214, the method may include creating, by the hardware management unit, an address range mapping for the application key. At block 216, the method may include storing the address range mapping in a key region table in a secure portion of memory. The secure memory may be included in the MMU, a RAM, etc. Method 200 may eventually continue to block 218, where method 200 may stop.

Figure 3:
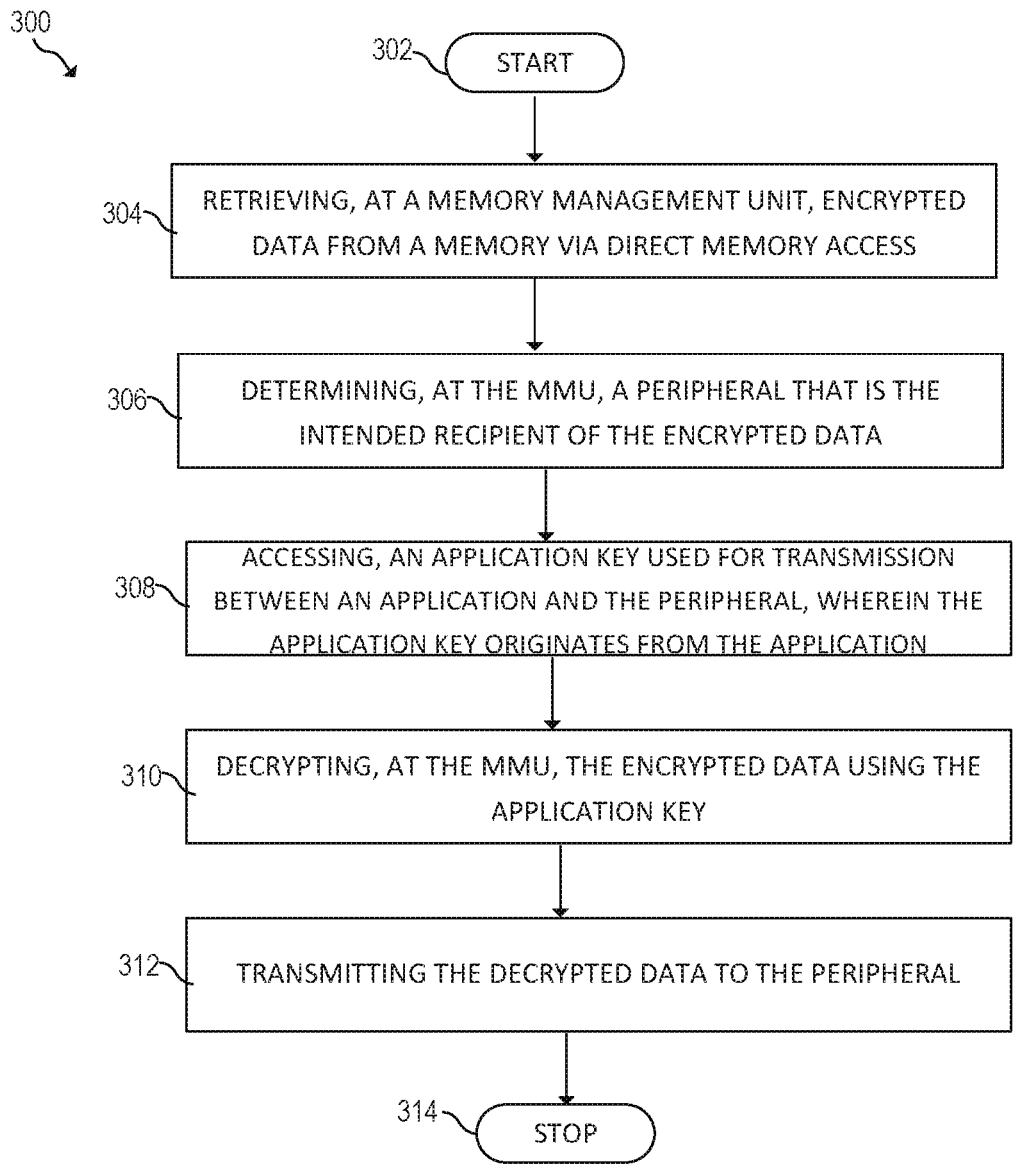
FIG. 3 is a flowchart of an example method for providing an application key to a peripheral.

FIG. 3 is a flowchart of an example method 300 for providing an application key to a peripheral. Method 300 may be described below as being executed or performed by a system, for example, system 100 of FIG. 1, system 400 of FIG. 4, and/or system 500 of FIG. 5. Other suitable systems and/or computing devices may be used as well.

Method 300 may be implemented in the form of executable instructions stored on at least one machine-readable storage medium of the system and executed by at least one processor of the system. The processor may include a Central Processing Unit (CPU) or another suitable hardware processor. Machine-readable storage medium may comprise, for example, may be, for example, Random Access Memory (RAM), an Electrically-Erasable Programmable Read-Only Memory (EEPROM), a storage drive, an optical disc, and/or other suitable memory. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302 and continue to block 304, where the method may include retrieving, at a memory management unit (MMU), encrypted data from a memory via direct memory access. The MMU may include a hardware encryption/decryption unit. At block 306, the method may include determining, at the MMU, a peripheral that is the intended recipient of the encrypted data, wherein the peripheral is attached to a computer system. At block 308, the method may include accessing an application key used for transmission between an application and the peripheral, wherein the application key originates from the application. A plurality of application keys, including the application key originating from the application, may be stored in a memory region of the MMU. At block 310, the method may include decrypting, at the MMU, the encrypted data using the application key. The encrypted data may be decrypted by a hardware encryption/decryption unit of the MMU. At block 312, the method may include transmitting the decrypted data to the peripheral. Method 300 may eventually continue to block 314, where method 300 may stop.

Figure 4:
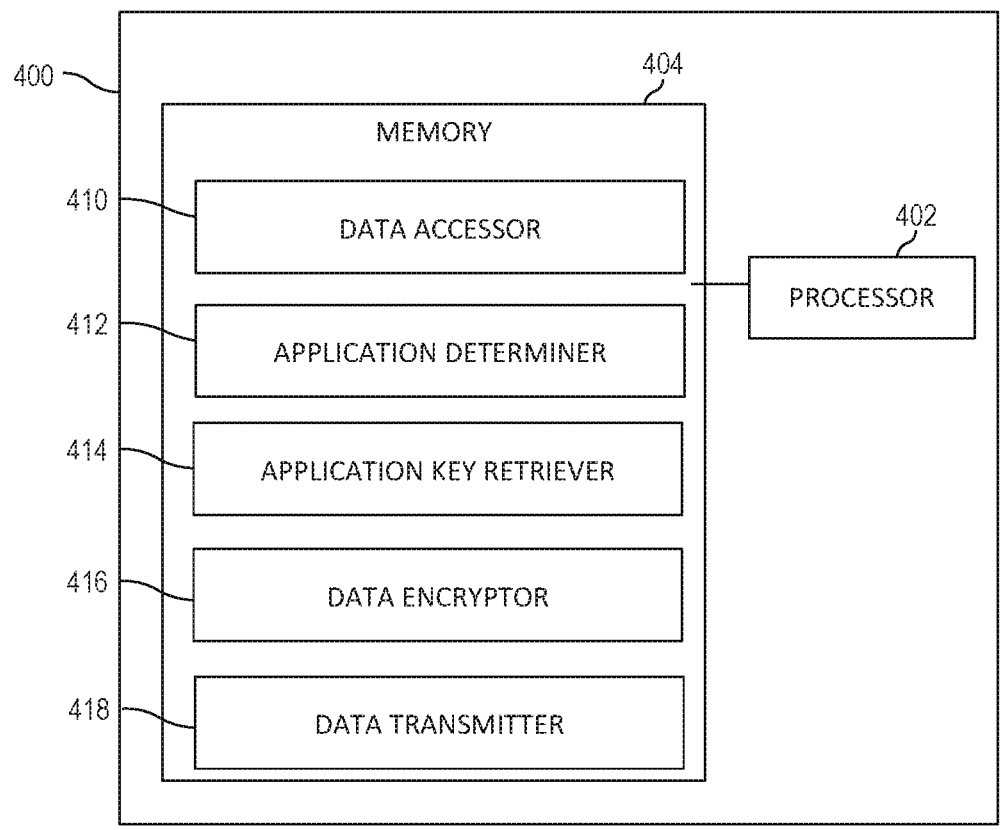
FIG. 4 is a block diagram of an example system for direct memory access encryption with application provided keys.

FIG. 4 is a block diagram of an example system 400 for direct memory access encryption with application provided keys. System 400 may include a processor 402 and a memory 404 that may be coupled to each other through a communication link (e.g., a bus). Processor 402 may include a Central Processing Unit (CPU) or another suitable hardware processor. In some examples, memory 404 stores machine readable instructions executed by processor 402 for system 400. Memory 404 may include any volatile memory, non-volatile memory, or any suitable combination of volatile and non-volatile memory. Memory 404 may comprise, for example, may be, for example, Random Access Memory (RAM), an Electrically-Erasable Programmable Read-Only Memory (EEPROM), a storage drive, an optical disc, and/or other suitable memory. Memory 404 may also include a random access non-volatile memory that can retain content when the power is off.

Memory 404 stores instructions to be executed by processor 402 including instructions for data accessor 410, application determiner 412, application key retriever 414, data encryptor 416 and data transmitter 418. The components of system 400 may be implemented in the form of executable instructions stored on at least memory 404 and executed by at least one processor of system 400. Memory 404 may be non-transitory. Each of the components of system 400 may be implemented in the form of at least one hardware device including electronic circuitry for implementing the functionality of the component.

Processor 402 may execute instructions of data accessor 410 to access, at a memory management unit (MMU), data from a peripheral attached to a computer system. The MMU may include a hardware encryption/decryption unit. Processor 402 may execute instructions of application determiner 412 to determine, at the MMU, an application that is an intended recipient of the encrypted data, wherein the application executes on the computer system. Processor 402 may execute instructions of application key retriever 414 to retrieve an application key used for transmission between the application and the peripheral. A plurality of application keys including the application key may be stored in a memory region of the MMU. Processor 402 may execute instructions of data encryptor 416 to encrypt, at the MMU, the data using the application key. The data may be encrypted by a hardware encryption/decryption unit of the MMU. Processor 402 may execute instructions of data transmitter 418 to transmit the encrypted data to a memory of the computer system.

Figure 5:
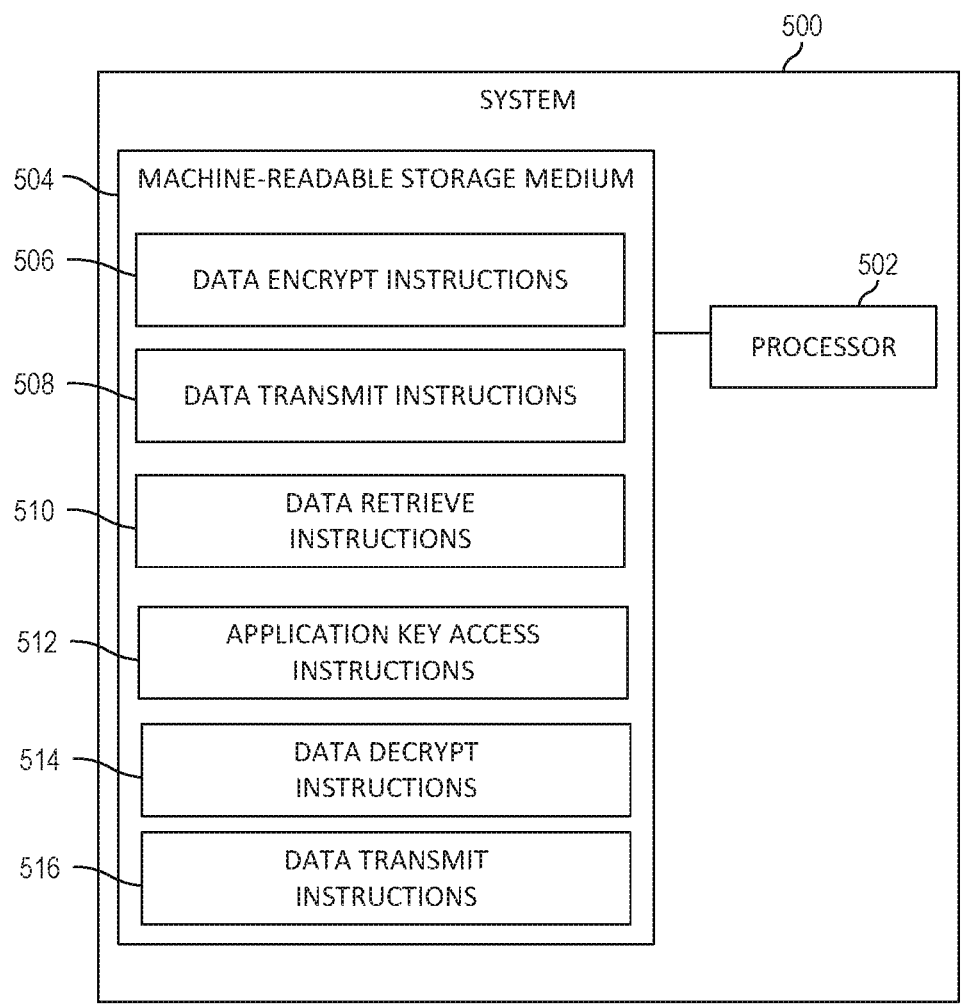
FIG. 5 is a block diagram of an example system for direct memory access encryption with application provided keys.

FIG. 5 is a block diagram of an example system 500 for direct memory access encryption with application provided keys. System 500 may be similar to system 100 of FIG. 1, for example. In the example illustrated in FIG. 5, system 500 includes a processor 502 and a machine-readable storage medium 504. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512, 514 and 516. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Memory 404 may comprise, for example, may be, for example, Random Access Memory (RAM), an Electrically-Erasable Programmable Read-Only Memory (EEPROM), a storage drive, an optical disc, and/or other suitable memory Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, data encrypt instructions 506, when executed by a processor (e.g., 502), may cause system 500 to encrypt, at the processor, data for a peripheral attached to a computer system. Data transmit instructions 508, when executed by a processor (e.g., 502), may cause system 500 to transmit the encrypted data to a memory of the computer system. Data retrieve instructions 510, when executed by a processor (e.g., 502), may cause system 500 to retrieve, at a memory management unit (MMU) operably coupled to the processor, encrypted data from the memory via direct memory access. The MMU may include a hardware encryption/decryption unit. An operating system of the computer system provides data mapping between a first region of the memory accessed by the MMU and a second region of the memory accessed by the processor.

Application key access instructions 512, when executed by a processor (e.g., 502), may cause system 500 to access an application key used for transmission between an application and the peripheral. A plurality of application keys including the application key may be stored in a memory region of the MMU. Data decrypt instructions 514, when executed by a processor (e.g., 502), may cause system 500 to decrypt, at the MMU, the encrypted data using the application key. The data may be decrypted by a hardware encryption/decryption unit of the MMU. Data transmit instructions 516, when executed by a processor (e.g., 502), may cause system 500 to transmit the decrypted data to the peripheral.

The foregoing disclosure describes a number of examples for direct memory access encryption with application provided keys. The disclosed examples may include systems, devices, computer-readable storage media, and methods for direct memory access encryption with application provided keys. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method for direct memory access encryption with application provided keys comprising:
retrieving, at a memory management unit (MMU), encrypted data from a memory via direct memory access;
determining, at the MMU, a peripheral that is the intended recipient of the encrypted data, wherein the peripheral attached to a computer system;
accessing an application key used for transmission between an application and the peripheral, wherein the application key originates from the application;
decrypting, at the MMU, the encrypted data using the application key;
transmitting the decrypted data to the peripheral;

transmitting, via an operating system of the computer system, an encrypted configuration request including a security key corresponding to the peripheral, a first identity of a hardware management unit and a second identity of the peripheral;

decrypting, at the hardware management unit, the encrypted configuration request;

signing, at the hardware management unit, a response message to the application comprising a matching security key; and transmitting, via the operating system, the response message to the application.

2. The method of claim 1, wherein the MMU includes a hardware encryption/decryption unit and the hardware encryption/decryption unit decrypts the encrypted data.

3. The method of claim 1, wherein a plurality of application keys including the application key is stored in a memory region of the MMU.

4. The method of claim 1, wherein the operating system of the computer system provides data mapping between a first region of the memory accessed by the MMU and a second region of the memory accessed by a processor of the computer system.

5. The method of claim 4, comprising:
creating, by the operating system, a mapping between an address range of the memory and the peripheral.

6. The method of claim 4, comprising:
creating, by the hardware management unit, an address range mapping for the application key; and
storing the address range mapping in a key region table in a secure portion of memory.

7. A system for direct memory access encryption with application provided keys comprising:
a non-transitory memory storing instructions;
a processor configured to execute the instructions to cause the system to:
access, at a memory management unit (MMU), data from a peripheral attached to a computer system;
determine, at the MMU, an application that is the intended recipient of the data, wherein the application executes on the computer system;
retrieve an application key used for transmission between the application and the peripheral;
encrypt, at the MMU, the data using the application key; and
transmit the encrypted data to a memory of the computer system; and
a hardware component to:
receive, from an operating system of the computer system, an encrypted configuration request including a security key corresponding to the peripheral, a first identity of the hardware component and a second identity of the peripheral;
decrypt the encrypted configuration request; and
sign a response message to the application comprising a matching security key.

8. The system of claim 7, wherein the MMU includes a hardware encryption/decryption unit and the encrypted data is encrypted by the hardware encryption/decryption unit.

9. The system of claim 7, wherein a plurality of application keys including the application key is stored in a memory region of the MMU.

10. The system of claim 7, wherein the operating system of the computer system provides data mapping between a first region of the memory accessed by the MMU and a second region of the memory accessed by a processor of the computer system.

11. The system of claim 7, wherein the hardware component is further to:
create an address range mapping for the application key; and
store the address range mapping in a key region table.

12. The system of claim 7, wherein the processor is configured to execute the instructions to cause the system to create, by the operating system, a mapping between an address range of the memory and the peripheral.

13. A system for direct memory access encryption with application provided keys comprising:
a processor to:
encrypt data for a peripheral attached to the system, and
transmit the encrypted data to a memory of the system; and
a first hardware component, operably coupled to the processor, to:
retrieve the encrypted data from the memory via direct memory access,
access an application key used for transmission between an application and the peripheral,
decrypt the encrypted data using the application key, and
transmit the decrypted data to the peripheral; and
a second hardware component coupled to the first hardware component to:
receive an encrypted configuration request including a security key corresponding to the peripheral, a first identity of the second hardware component and a second identity of the peripheral;
decrypt the encrypted configuration request;
sign a response message to the application comprising a matching security key; and
transmit the response message to the application.

14. The system of claim 13, wherein the first hardware component is further to:
access, via an operating system, a region of the memory accessed by the processor.

15. The system of claim 13 wherein the first hardware component comprises an encryption/decryption hardware unit to decrypt the encrypted data.

16. The system of claim 13 wherein the first hardware component is further to:
access a memory region of the first hardware component storing a plurality of application keys including the application key.

17. The system of claim 13, wherein the processor is further to:
create a mapping between an address range of the memory and the peripheral.

18. The system of claim 17, wherein the second hardware component is further to:
create an address range mapping for the application key; and
store the address range mapping in a key region table.

19. The system of claim 17, wherein the operating system of the computer system provides data mapping between a first region of the memory accessed by the first hardware component and a second region of the memory accessed by a processor of the computer system.

* * * * *